United States Patent
Kondo et al.

(10) Patent No.: US 9,014,883 B2
(45) Date of Patent: Apr. 21, 2015

(54) IN-VEHICLE CONGESTION-STATUS DISPLAY SYSTEM AND CONGESTION-STATUS GUIDANCE METHOD

(75) Inventors: Tetsu Kondo, Chiyoda-ku (JP); Kenichi Ishiguri, Chiyoda-ku (JP)

(73) Assignee: Mitsubishi Electric Corporation, Chiyoda-ku, Tokyo (JP)

( * ) Notice: Subject to any disclaimer, the term of this patent is extended or adjusted under 35 U.S.C. 154(b) by 50 days.

(21) Appl. No.: 13/993,157

(22) PCT Filed: Dec. 20, 2010

(86) PCT No.: PCT/JP2010/072920
§ 371 (c)(1),
(2), (4) Date: Jun. 11, 2013

(87) PCT Pub. No.: WO2012/086000
PCT Pub. Date: Jun. 28, 2012

(65) Prior Publication Data
US 2013/0268148 A1    Oct. 10, 2013

(51) Int. Cl.
*B61L 15/00* (2006.01)
*B60N 5/00* (2006.01)
(Continued)

(52) U.S. Cl.
CPC ............... *B61L 15/009* (2013.01); *B60N 5/00* (2013.01); *B61L 23/00* (2013.01); *B61L 27/0077* (2013.01)

(58) Field of Classification Search
CPC ... B61L 15/009; B61L 27/0077; B61L 23/00; B60N 5/00
USPC ............................................. 701/19; 104/28
See application file for complete search history.

(56) References Cited

U.S. PATENT DOCUMENTS 6,374,176 B1 * 4/2002 Schmier et al. ............... 701/465
6,736,317 B1 * 5/2004 McDonald et al. ........... 235/384

FOREIGN PATENT DOCUMENTS

JP    60-008155 A    1/1985
JP    61-018559 A    1/1986
(Continued)

OTHER PUBLICATIONS

International Search Report (PCT/ISA/210) issued on Jan. 25, 2011, by the Japanese Patent Office as the International Searching Authority for International Application No. PCT/JP2010/072920.
(Continued)

*Primary Examiner* — Thomas Tarcza
*Assistant Examiner* — Kevin Myhre
(74) *Attorney, Agent, or Firm* — Buchanan Ingersoll & Rooney PC

(57) ABSTRACT

The present invention provides an in-vehicle congestion-status display system that notifies railway users of a congestion status of each vehicle of a train. The in-vehicle congestion-status display system includes a main server that calculates a congestion rate immediately before boarding, which is a predicted value of a congestion rate when alighting of users is complete, of each vehicle of a train, based on a congestion rate during travel and an alighting rate acquired in a past and held as information indicating a difference between a congestion rate during travel immediately before arriving at the station and a congestion rate when alighting of users is complete after arriving at a next stop of the train, and a display device that notifies users of the congestion rate immediately before boarding calculated for each vehicle of the train.

12 Claims, 13 Drawing Sheets

(51) Int. Cl.
  *B61L 27/00*   (2006.01)
  *B61L 23/00*   (2006.01)

(56) References Cited

FOREIGN PATENT DOCUMENTS

| JP | 3-121972 A | 5/1991 |
|---|---|---|
| JP | 5-058297 A | 3/1993 |
| JP | 5-254440 A | 10/1993 |
| JP | 2000-190847 A | 7/2000 |
| JP | 2006-188150 A | 7/2006 |
| JP | 2007-290574 A | 11/2007 |
| JP | 2009-023444 A | 2/2009 |
| JP | 2009-057006 A | 3/2009 |
| JP | 2009-190431 A | 8/2009 |

OTHER PUBLICATIONS

Written Opinion (PCT/ISA/237) issued on Jan. 25, 2011, by the Japanese Patent Office as the International Searching Authority for International Application No. PCT/JP2010/072920.

* cited by examiner

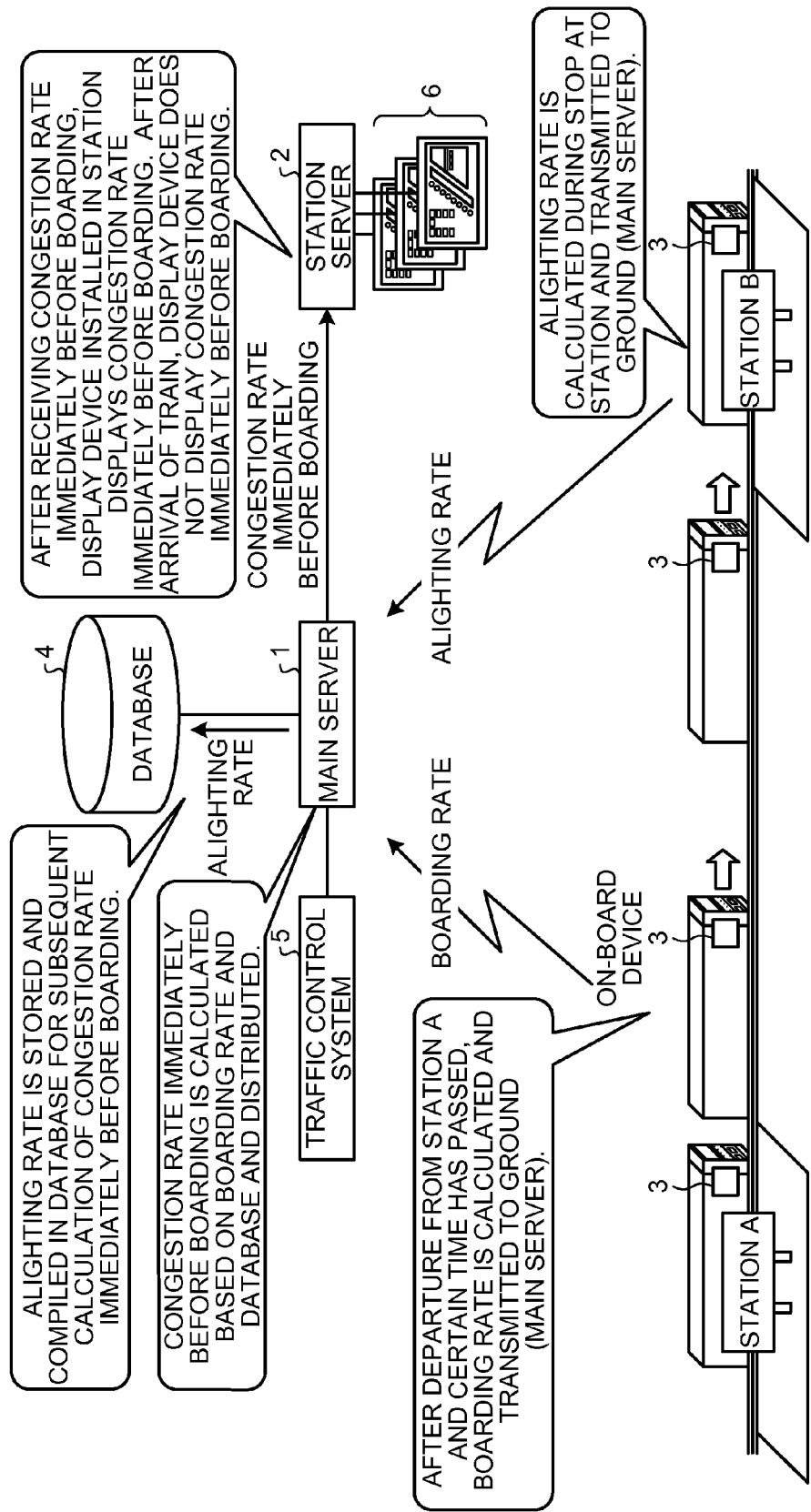

FIG.2

| TIME | | | PLACE | | | TRAIN INFORMATION | | | OTHER INFORMATION | | | ALIGHT-ING RATE |
|---|---|---|---|---|---|---|---|---|---|---|---|---|
| DATE | TIME | WEEKDAY/HOLIDAY | STATION | PLAT-FORM | VEHICLE | TRAIN TYPE | DESTI-NATION | | WEATH-ER | TEMPER-ATURE | SPECIAL DAY | |
| JUNE 11 | 18:00 | WEEKDAY | STATION A | PLAT-FORM 2 | FIRST VEHICLE | EXPRESS | STATION Z | | RAIN | 26°C | — | 8% |
| JUNE 11 | 18:00 | WEEKDAY | STATION A | PLAT-FORM 2 | SECOND VEHICLE | EXPRESS | STATION Z | | RAIN | 26°C | — | 2% |
| JUNE 11 | 18:00 | WEEKDAY | STATION A | PLAT-FORM 2 | THIRD VEHICLE | EXPRESS | STATION Z | | RAIN | 26°C | — | 15% |
| ... | ... | ... | ... | ... | ... | ... | ... | | ... | ... | ... | ... |
| AUGUST 21 | 20:00 | SATURDAY | STATION E | PLAT-FORM 3 | FIRST VEHICLE | LOCAL | STATION A | | SUNNY | 32°C | ○ | 68% |
| AUGUST 21 | 20:00 | SATURDAY | STATION E | PLAT-FORM 3 | SECOND VEHICLE | LOCAL | STATION A | | SUNNY | 32°C | ○ | 50% |
| AUGUST 21 | 20:00 | SATURDAY | STATION E | PLAT-FORM 3 | THIRD VEHICLE | LOCAL | STATION A | | SUNNY | 32°C | ○ | 72% |
| ... | ... | ... | ... | ... | ... | ... | ... | | ... | ... | ... | ... |

SPECIAL DAY...WHEN THERE IS EVENT SUCH AS FIREWORKS, ALIGHTING RATE LARGELY DIFFERS FROM THAT OF NORMAL TIME. THIS CONDITION IS APPLIED TO DISCRIMINATE SPECIAL DAY FROM NORMAL TIME.

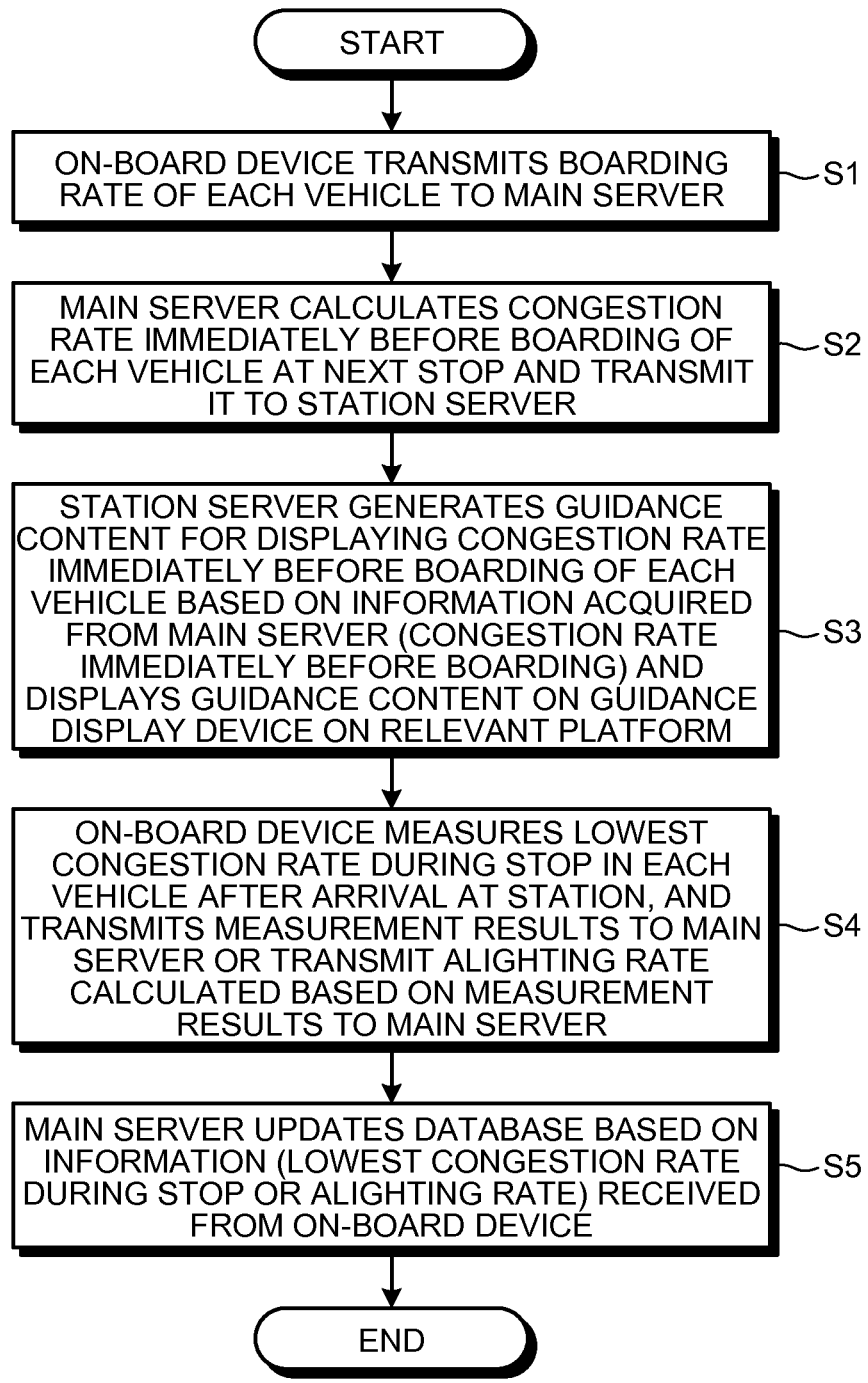

FIG.4

SUB-DATABASE OF NTH LINE IN STATION ○○

| DATE | TIME | WEEKDAY/ HOLIDAY | TRAIN TYPE | DESTI-NATION | VEHICLE | ALIGHTING RATE |
|---|---|---|---|---|---|---|
| 1/1 TO 1/15 | COMMUTING RUSH HOURS (7:00 TO 9:00) | WEEKDAY | △△ | □□ STATION | 1 | a% |
| | | | | | 2 | b% |
| | | | | | 3 | c% |
| | | | | | ⋮ | ⋮ |
| | | | | | n | d% |
| 1/1 TO 1/15 | RETURN RUSH HOURS (17:30 TO 21:30) | WEEKDAY | △△ | □□ STATION | 1 | e% |
| | | | | | 2 | f% |
| | | | | | 3 | g% |
| | | | | | ⋮ | ⋮ |
| | | | | | n | h% |
| 1/1 TO 1/15 | OTHER HOURS (PERIOD OF TIME OTHER THAN ABOVE) | WEEKDAY | △△ | □□ STATION | 1 | i% |
| | | | | | 2 | j% |
| | | | | | 3 | k% |
| | | | | | ⋮ | ⋮ |
| | | | | | n | l% |
| 1/1 TO 1/15 | RETURN RUSH HOURS (7:00 TO 9:00) | WEEKDAY | ▲▲ | ■■ STATION | 1 | m% |
| | | | | | 2 | n% |
| | | | | | 3 | o% |
| | | | | | ⋮ | ⋮ |
| | | | | | n | p% |
| ⋮ | ⋮ | ⋮ | ⋮ | ⋮ | ⋮ | ⋮ |
| 1/1 TO 1/15 | RETURN RUSH HOURS (7:00 TO 9:00) | HOLIDAY | △△ | □□ STATION | 1 | q% |
| | | | | | 2 | r% |
| | | | | | 3 | s% |
| | | | | | ⋮ | ⋮ |
| | | | | | n | t% |
| ⋮ | ⋮ | ⋮ | ⋮ | ⋮ | ⋮ | ⋮ |
| 1/16 TO 1/31 | RETURN RUSH HOURS (7:00 TO 9:00) | HOLIDAY | △△ | □□ STATION | 1 | a'% |
| | | | | | 2 | b'% |
| | | | | | 3 | c'% |
| | | | | | ⋮ | ⋮ |
| | | | | | n | d'% |
| ⋮ | ⋮ | ⋮ | ⋮ | ⋮ | ⋮ | ⋮ |

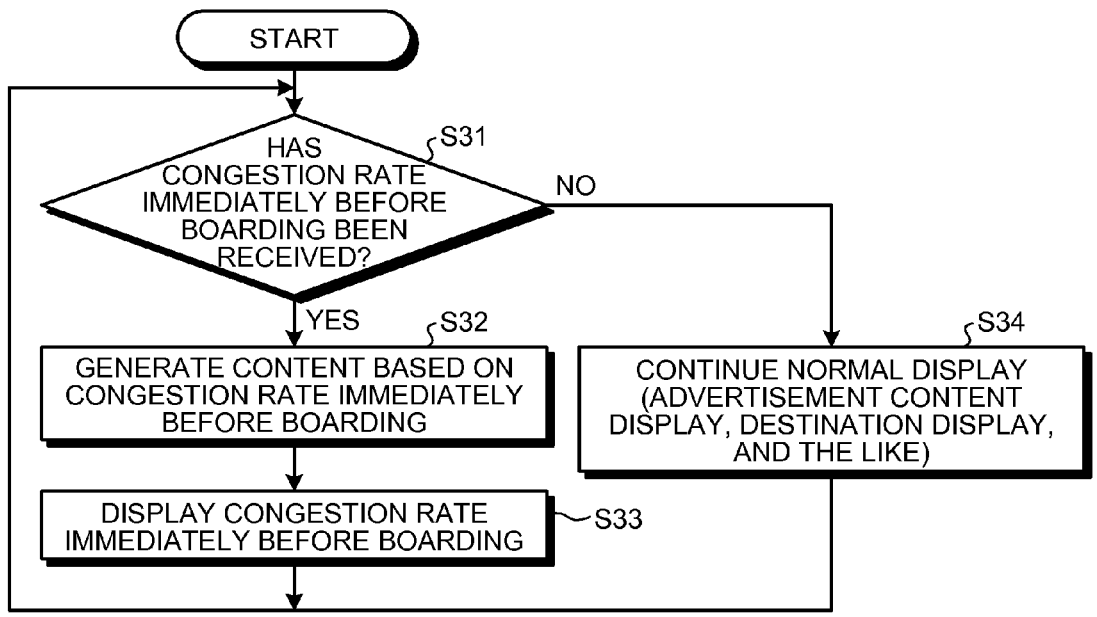

| FOR-MATION | NEXT STOP | TRAIN TYPE | DESTI-NATION | CONNECTING TRAIN | VEHICLE | CONGESTION RATE IMMEDIATELY BEFORE BOARDING |
|---|---|---|---|---|---|---|
| XX FOR-MATION | ○○ STATION | △△ | □□ STATION | YY FORMATION | 1 | A% |
| | | | | | 2 | B% |
| | | | | | 3 | C% |
| | | | | | ⋮ | ⋮ |
| | | | | | n | G% |

IN-VEHICLE CONGESTION-STATUS DISPLAY SYSTEM AND CONGESTION-STATUS GUIDANCE METHOD

FIELD

The present invention relates to an in-vehicle congestion-status display system that notifies users of a congestion status in a railway vehicle and a congestion-status guidance method.

BACKGROUND

In recent years, there has been widely used a system that displays destination guidance contents and advertisement contents, by using an LCD display installed on a cross bar over a door in a vehicle as a display medium. Furthermore, there has been established a new business model that uses a system that displays destination guidance contents and advertisement guidance contents by using an LCD display installed at a station as a display medium.

For example, Patent Literature 1 describes a technology of providing information of an expected arrival time of trains to users on a platform of a station. In the technology described in Patent Literature 1, users waiting for the arrival of a train are provided with pictures indicating the state of boarding and alighting passengers for each door of a train scheduled to arrive next at a station one stop before and static images of the state in the vehicles after the train has departed the station one stop before, which are displayed on a display device on the platform. Furthermore, Patent Literature 2 describes a technology of deriving a vehicle occupancy of each vehicle in a train during travel, and notifying the vehicle occupancy together with a congestion status on a platform of a next arrival station to users on the platform of the next arrival station and users outside the station premises. Further, Patent Literature 3 describes a technology of estimating a congestion degree for each vehicle of a train by using an optical sensor installed besides the rails and displaying guidance of boarding positions with respect to users waiting for the train at the next arrival station.

CITATION LIST

Patent Literatures

Patent Literature 1: Japanese Patent Application Laid-open No. 2009-190431
Patent Literature 2: Japanese Patent Application Laid-open No. 2000-190847
Patent Literature 3: Japanese Patent Application Laid-open No. 2009-57006

SUMMARY

Technical Problem

For railway users, it is more comfortable to board a vehicle having a congestion degree as low as possible. Meanwhile, for railway operators, it is desirable that there is no variability in the congestion degree among respective vehicles of a train. When there is great variability in the congestion degree among respective vehicles in the same formation, for example, a wear amount of a brake pad of the vehicle that travels in a state of having a congestion degree higher than that of other vehicles increases. As a result, a maintenance work is required for replacing the brake pad of a part of the vehicles in the formation, which is not efficient. The number of the maintenance work can be reduced by replacing the brake pads of all the vehicles in the formation all together, and it is advantageous in view of the maintenance cost and work efficiency. Furthermore, in a vehicle having a high congestion degree, a wear amount of wheels increases, and also in this case, the frequency of the maintenance work increases. Further, when a part of vehicles is congested, a required time until all passengers board the vehicles increases, and a delay of the train may occur. Therefore, it is considered that it is desirable for users and railway operators that the congestion degrees of respective vehicles of a train are equalized.

However, in the conventional technology described above, the congestion degree of vehicles (traveling vehicles), which are arriving at a station, is simply used to perform the display and the like, and there is a question as to whether the guidance display that contributes to the equalization of the congestion degrees between vehicles can be realized sufficiently. That is, in the conventional technology described above, users who alight at the station are not taken into consideration. Therefore, it cannot be considered that guiding the users waiting at the station to the vehicles having a low congestion degree while the train is traveling is always the best method. Even in a vehicle having a high congestion degree at the time of arriving at the station, if the number of passengers alighting from the vehicle is larger than that of other vehicles, such a case can be considered that the congestion degree at a time when the waiting users board the vehicle decreases abruptly, and the magnitude relation with the congestion degree in other vehicles is reversed. In this manner, the conventional technology have a problem in the reliability of information provided to the users.

The present invention has been achieved to solve the above problems, and an object of the present invention is to provide an in-vehicle congestion-status display system and a congestion-status guidance method that provide information about a congestion degree in a vehicle before boarding to railway users with a reliability higher than conventional technology.

Solution to Problem

In order to solve above-mentioned problems and achieve the object, according to an aspect of the present invention, there is an in-vehicle congestion-status display system that notifies railway users of a congestion status of each vehicle of a train, the system including: a main server that calculates a congestion rate immediately before boarding, which is a predicted value of a congestion rate when alighting of users is complete at a station, of each vehicle of a train, based on a congestion rate during travel and an alighting rate acquired in a past and held as information indicating a difference between a congestion rate during travel immediately before arriving at the station and a congestion rate when alighting of users is complete after arriving at a next stop of the train; and a display device that notifies users of the congestion rate immediately before boarding calculated for each vehicle of the train, wherein when the train arrives at a station where it is known in advance that an error from an actual congestion rate is expected to increase, when the congestion rate immediately before boarding is calculated by using the alighting rate, the main server does not calculate the congestion rate immediately before boarding.

Advantageous Effects of Invention

According to the present invention, a congestion rate can be notified to users, taking the number of passengers alighting at a station into consideration, and information of a congestion status in a vehicle before boarding can be provided with a reliability higher than conventional techniques.

BRIEF DESCRIPTION OF DRAWINGS

FIG. 1 is an overall configuration example and an operation outline of an in-vehicle congestion-status display system according to a first embodiment.

FIG. 2 is a configuration example of a database.

FIG. 3 is a flowchart of an operation outline of the in-vehicle congestion-status display system according to the first embodiment.

FIG. 4 is a configuration example of a sub-database.

FIG. 7 is an example of information transmitted from the main server to a station server.

FIG. 8 is a flowchart of an operation performed by the station server when the station server has received a congestion rate immediately before boarding.

DESCRIPTION OF EMBODIMENTS

Figure 5:
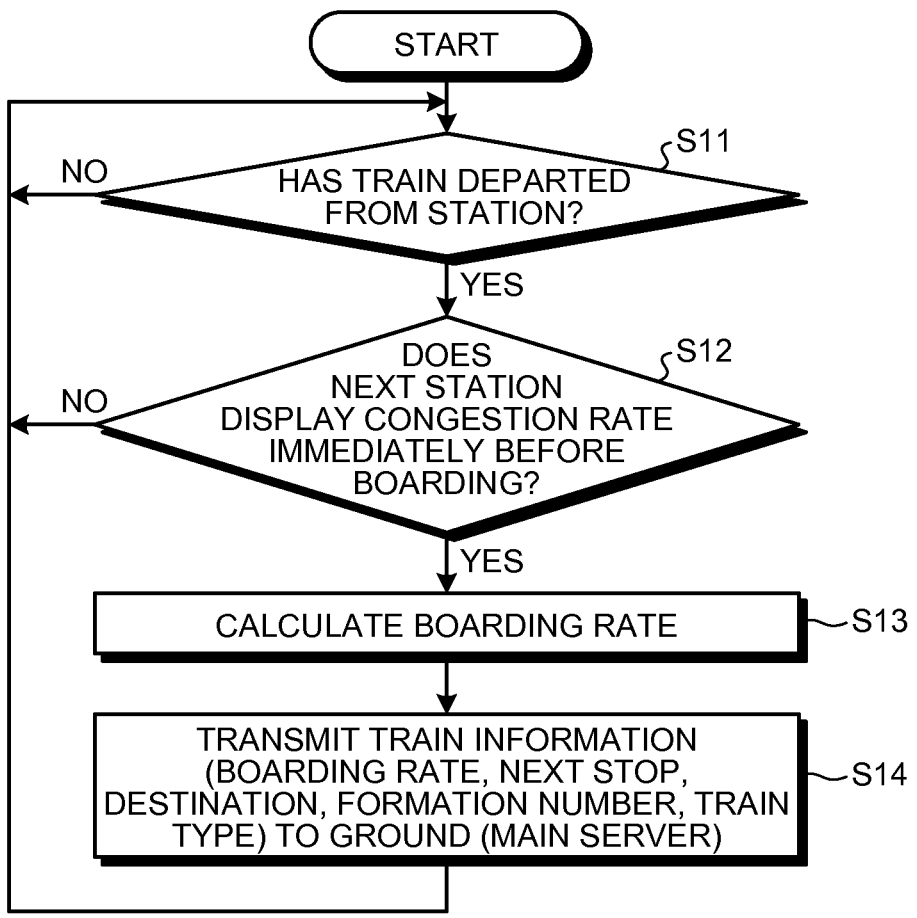
FIG. 5 is a flowchart of an operation performed by an on-board device after a train has departed a station.

An in-vehicle congestion-status display system and a congestion-status guidance method according to embodiments of the present invention will be explained below in detail with reference to the accompanying drawings. The present invention is not limited to the embodiments.

First Embodiment

FIG. 1 is an overall configuration example and an operation outline of an in-vehicle congestion-status display system according to a first embodiment. As shown in FIG. 1, the in-vehicle congestion-status display system according to the present embodiment includes a main server 1, a station server 2 installed at a station, an on-board device 3 mounted on a train, a database 4, a traffic control system 5, and a display device 6 installed in the station. A single-vehicle train is shown in FIG. 1. However, a train (a formation) in which a plurality of vehicles are coupled together is assumed. Furthermore, the station server 2 is also installed in a station A. However, descriptions thereof will be omitted for convenience of explanation.

The main server 1 has a function of performing wireless communication with the on-board device 3 (a communication device) and calculates a congestion rate immediately before boarding, which is used for guidance display on the display device 6 installed at the next stop of a train being travelling, based on information acquired from the on-board device 3. The congestion rate immediately before boarding is a predicted value of the congestion rate at a time when all users who are to alight at this station have alighted after the train arrived at the station. The congestion rate immediately before boarding is calculated for each vehicle. That is, the congestion rate immediately before boarding is a prediction result of the congestion rate at a time when the train has arrived at the station and alighting of users (passengers) from each vehicle has been complete. The main server 1 updates the database 4 based on the information acquired from the train.

The station server 2 generates guidance contents to be displayed on the display device 6 based on the information and the like received from the main server 1.

After the train starts traveling (after having departed a station), the on-board device 3 installed in the train calculates a boarding rate (a congestion rate) of each vehicle at a predetermined timing, and transmits the boarding rate to the main server 1 by wireless communication. For example, the boarding rate is calculated based on a vehicle weight indicated by AS pressure (air suspension pressure). When the boarding rate of each vehicle is controlled by a train-information control system (not shown) mounted on the train, the boarding rate can be acquired from the train-information control system and transmitted to the main server 1. Furthermore, when the train is in a stopping state at a station, the on-board device 3 monitors fluctuations in the congestion rate (the boarding rate) of each vehicle, calculates an alighting rate based on the lowest value of the congestion rate (the lowest congestion rate during stop at the station), and transmits the alighting rate to the main server 1. The alighting rate is information indicating a difference between the boarding rate during travel and the boarding rate at a time when the train has arrived at a station and alighting of users is complete. Specifically, the alighting rate is information indicating how much the boarding rate at the time of arrival at a station has changed when alighting of users is complete at the station. As the alighting rate increases, the boarding rate largely decreases due to alighting of users at the station.

The database 4 manages the information and the like to be used when the main server 1 calculates the congestion rate immediately before boarding. The configuration of the database 4 is as shown in, for example, FIG. 2. FIG. 2 is an example in which records including information of time, information of place, information of train, other pieces of information, and the alighting rate are managed. As shown in FIG. 2, the information of time includes date, time, holiday/weekday, the information of place includes station, platform, and vehicle (information indicating which vehicle it is), the information of train (train information) includes train type (information indicating whether it is an express train, a local train, and the like), and destinations, and the other pieces of information include the weather, temperature, and a special day (information whether it is the special day). The special day is information indicating that the number of users is greatly different from a normal day because there has been an event or the like around the station. The alighting rate is information having been calculated by the on-board device 3 in the past and transmitted to the main server 1. The information of place can be acquired, for example, from the traffic control system 5. The information of train can be acquired from the train-information control system (not shown)

mounted on the train. When the on-board device 3 transmits the boarding rate, the information of train can be added and transmitted. The other pieces of information can be acquired, for example, from the station server 2.

When the main server 1 acquires the alighting rate, the database 4 is updated based on the acquired alighting rate. Specifically, upon acquisition of the alighting rate, the main server 1 collects various pieces of information to be registered in the records of the database 4 together with the acquired alighting rate, that is, the information of time at a time when having acquired the alighting rate (date, time, and weekday/holiday), the information of place (station, platform, and vehicle), the information of train (train type and destination), and other pieces of information (weather, temperature, and special day), and registers the information in the database 4 together with the alighting rate. The configuration of the database 4 is not limited that shown in FIG. 2. A part of the information registered in the database 4 is used when the main server 1 calculates the congestion rate immediately before boarding. In FIG. 1, a configuration example in which the database 4 is present independently is shown. However, for example, the database 4 can be provided in the main server 1.

The traffic control system 5 controls information of each train (an operation status) during travel (during an operation) on a railway line.

The display device 6 is installed at the station premises, and performs guidance display of arriving trains to users according to an instruction of the station server 2. In the present embodiment, it is assumed that the display device 6 is installed on a platform.

<Overall Operation of in-Vehicle Congestion-Status Display System>

An overall operation of the in-vehicle congestion-status display system according to the first embodiment is explained with reference to FIGS. 1 and 3. FIG. 3 is a flowchart of an operation outline of the in-vehicle congestion-status display system according to the first embodiment. An operation example in which the train shown in FIG. 1 departs the station A, and travels to a station B, which is the next stop, is explained.

First, when the train departs the station (the station A) and a certain time has passed, the on-board device 3 in the train calculates the boarding rate (the boarding rate of each vehicle) by using the information controlled by the train-information control system (not shown) or the like, and transmits the boarding rate to the main server 1 installed on the ground (Step S1). The boarding rate is notified by wireless communication. The on-board device 3 transmits the boarding rate together with identification information of the train, information of a vehicle number of the train, and the like so that the main server 1 can recognize that the boarding rate is for which vehicle of which train. The on-board device 3 can add information of place (a departure station) so that the main server can recognize when the boarding rate is acquired. Even when the on-board device 3 transmits the boarding rate, which is not added with the information of place (a boarding rate added with only the train identification information), the main server 1 can recognize the current position of the train by making an inquiry to the traffic control system 5.

Next, upon reception of the boarding rate from the train during travel (the on-board device 3), the main server 1 calculates the congestion rate immediately before boarding of each vehicle at the next stop based on the notified boarding rate, and transmits the congestion rate immediately before boarding to the station server 2 (Step S2). At Step S2, the main server 1 acquires the information of alighting rate at the next stop of the train, which is a sender of the boarding rate, from the database 4, and calculates the congestion rate immediately before boarding by using the acquired alighting rate and the notified boarding rate.

Because the information amount registered in the database 4 (see FIG. 2) is enormous, when the database shown in FIG. 2 is searched every time the information of the boarding rate is received, the processing load increases and the time required until the desired information is acquired becomes long, and thus it is not efficient. Therefore, for example, the main server 1 can separately construct and hold a sub-database as shown in FIG. 4 to acquire the information of alighting rate from the sub-database. The database in FIG. 2 (hereinafter, "main database") manages the alighting rate in association with the train, time, station, and the like. The sub-database shown in FIG. 4 is generated so that the congestion rate immediately before boarding can be calculated efficiently based on the information of the main database. The sub-database shown in FIG. 4 is generated by extracting the records having common "station" and "platform" from the records registered in the main database, grouping the extracted records by classifying these records by "date", "time", "weekday/holiday", "train type", and "destination", and calculating a mean value of the alighting rates classified into the same group, thereby compiling a database. The sub-database is generated for each platform of a station. In an example shown in FIG. 4, the date (a period) is separated bimonthly, and the time (a period of time) is divided into three, that is, commuting rush hours, return rush hours, and other hours. However, the separation method of the period and the dividing method of the period of time can be different from the methods described above. For example, the date can be separated by a unit of week or a unit of 10 days. The time can be separated into early morning, morning, daytime, evening, and night, or can be simply separated by a unit of N hours. Furthermore, other pieces of information can be included or unnecessary information can be omitted. For example, if the alighting rate hardly changes, even if the period (the date), the train type, and the destination are different, these items of train type and destination can be omitted. With regard to stations at which only local trains stop, information on the train type is unnecessary, and thus the train type can be omitted. When guidance of the congestion rate immediately before boarding is provided only on weekdays, the item of weekday/holiday can be omitted. In this manner, the configuration of the sub-database (information to be controlled) can be different for each station. However, at least the period of time (the time) and the alighting rate of each vehicle need to be included.

The station server 2 (the station server 2 of the station B) then generates guidance contents (screen) to be displayed on the display device 6 installed on the platform at which the train corresponding to the information arrives, based on the congestion rate immediately before boarding received from the main server 1, and displays the guidance contents on the display device 6 (Step S3). In the guidance contents to be displayed on the display device 6, users on the platform are notified of the congestion rate immediately before boarding of each vehicle of the train arriving next (a prediction result of the congestion rate at a time when alighting is complete and boarding is started). Any notification method can be used. For example, the information can be provided only by text (characters and numerals) or with an image (for example, a diagram of the formation of the train).

Next, when the train arrives at the station (the station B), the on-board device 3 on the train monitors fluctuations in the congestion rate (the boarding rate) of each vehicle during stop at the station to measure the lowest value of the congestion rate (hereinafter, "lowest congestion rate during stop") of each vehicle, and transmits a measurement result (the lowest congestion rate during stop of each vehicle) to the main server 1, or calculates the alighting rate based on the measurement result and transmits the calculated alighting rate to the main server 1 (Step S4). The congestion rate is calculated continuously based on a detection result of the AS pressure (the vehicle weight) or the like. Normally, because the congestion rate becomes the lowest at a time when alighting of users is complete (immediately before boarding is started), the lowest congestion rate during stop indicates the congestion rate immediately before the users who have been waiting for arrival of the train at the station starts boarding. That is, the lowest congestion rate during stop is the same information as the congestion rate immediately before boarding described above. A different point between these is that the lowest congestion rate during stop is the actual congestion rate (an actual measurement value), while the congestion rate immediately before boarding is a predicted congestion rate (a predicted value). It is desired that the predicted value approaches the actual measurement value. At the time of transmitting the measurement result or the alighting rate, the on-board device 3 also transmits information required by the main server 1 (for example, information of place or information of train) together.

The main server 1 then updates the database 4 (the main database) based on the information received from the on-board device 3 (the lowest congestion rate during stop or the congestion rate, and the information transmitted together therewith) (Step S5). Upon reception of the alighting rate calculated by the on-board device 3, the main server 1 registers the alighting rate in the database 4 in association with the information of time, the information of place, the information of train, and the other pieces of information. When the lowest congestion rate during stop detected by the on-board device 3 is received instead of the alighting rate, the main server 1 first calculates the alighting rate based on the lowest congestion rate during stop, and registers the calculated alighting rate in the database 4 in association with the information of time and the like.

According to such an operation, the users on the platform of the station can recognize the congestion rate of each vehicle of the train arriving next by checking the display device 6 installed on the platform. Because the congestion rate is predicted by taking into consideration the actual congestion rate (the boarding rate) of the train during travel and the number of users who are to alight at the station, more useful information can be provided to the users, as compared to conventional guidance display that simply notifies the actual congestion rate of the arriving train. As a result, the in-vehicle congestion-status display system according to the present embodiment can contribute to realization of congestion mitigation and averaging of the boarding rate.

The processes at Steps S1 to S5 are explained next in detail with reference to the drawings.

<Operation of on-Board Device 3 after Departing Station: Operation at the Time of Performing Step S1>

FIG. 5 is a flowchart of an operation performed by the on-board device 3 after a train has departed from a station, and indicates an operation example at the time of performing Step S1 described above.

When the train is during stop at the station, the on-board device 3 monitors whether the train has departed from the station (Step S11). As a result of monitoring, when detecting that the train has departed (YES at Step S11), the on-board device 3 determines whether the next station (the next stop) displays the congestion rate immediately before boarding (Step S12). The determination is performed, for example, whether the display device for displaying the guidance is installed. The on-board device 3 can create and hold a list (a database) of stations that display the guidance, and can perform the determination by verifying the list. When "there is no display of congestion rate immediately before boarding" (NO at Step S12), the process shifts to Step S11 to monitor arrival and departure to the next station.

When "there is display of congestion rate immediately before boarding" (YES at Step S12), the on-board device 3 calculates the boarding rate of each vehicle (a congestion rate during travel) (Step S13). The congestion rate is calculated by using the vehicle weight or the like. Because the vehicle weight is measured by the train-information control system or the like, the on-board device 3 acquires the information of the vehicle weight from the train-information control system to perform a calculation. The on-board device 3 acquires the vehicle weight as a reference in advance such as a vehicle weight in a state with the boarding rate being 0% (a state where no users are on board) from the train-information control system or the like. When the train-information control system is configured to calculate and hold the boarding rate, the on-board device 3 can acquire the boarding rate from the train-information control system.

When the boarding rate is acquired, the on-board device 3 transmits the boarding rate to the main server 1 on the ground as train information together with the next stop, destination, formation number, and train type (Step S14). The information transmitted to the main server 1 is not limited thereto. More pieces of information can be transmitted, or minimum pieces of information can be transmitted to suppress an amount of information transmitted wirelessly. For example, at least the boarding rate and the identification information of the train (the formation number) can be transmitted. When the formation number is known, the main server 1 can acquire the information such as the next stop or the destination of this formation (the train) by making an inquiry to the traffic control system 5.

In this manner, the on-board device 3 transmits the boarding rate and the information associated with the boarding rate to the main server 1. The boarding rate is acquired here by using the vehicle weight. However, the boarding rate can be acquired by using information other than the vehicle weight. For example, the number of boarding passengers and the number of alighting passengers during stop at the station are monitored by using a camera installed near the doors, and the boarding rate can be calculated based on monitoring results after departing from the station. Any methods can be used as long as the boarding rate can be acquired. The on-board device 3 holds the calculated (or acquired) boarding rate in order to use it for a calculation of an alighting rate described later.

<Operation of Main Server 1 when Boarding Rate is Notified from on-Board Device 3: Operation at the Time of Performing Step S2 Described Above>

Figure 6:
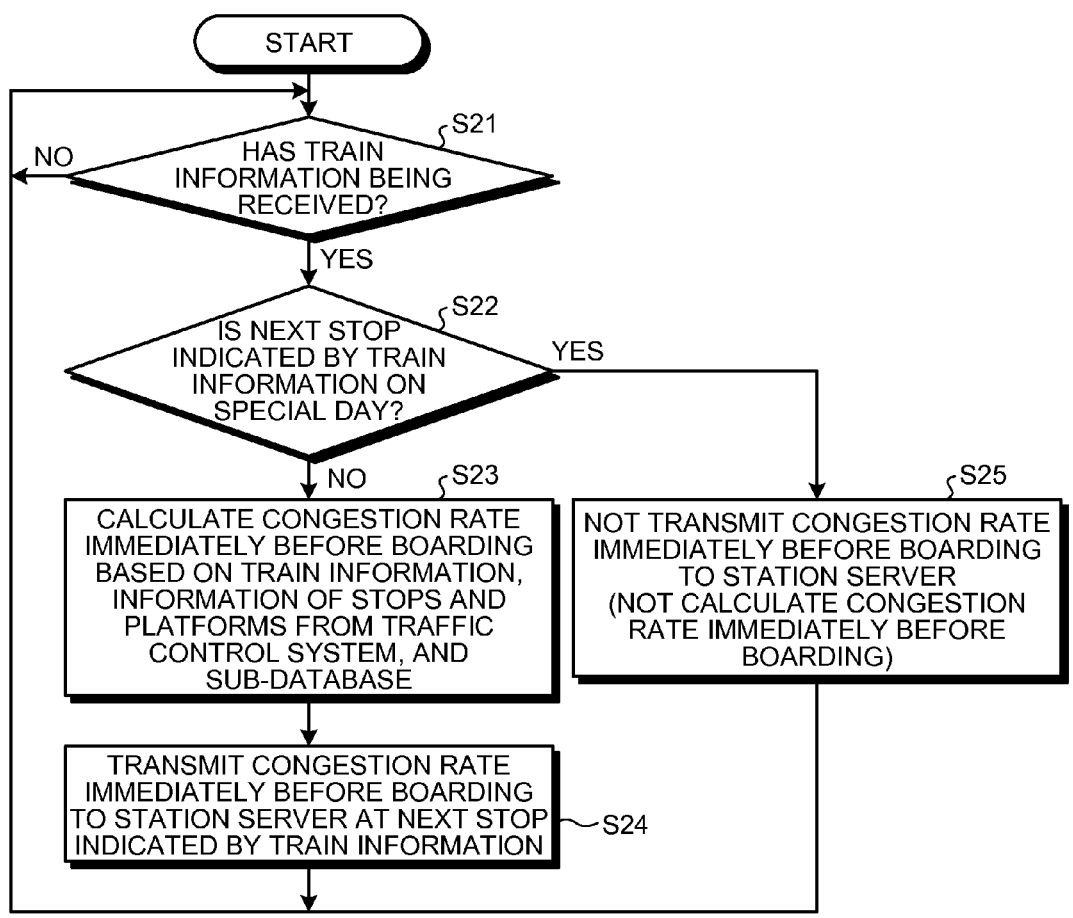
FIG. 6 is a flowchart of an operation performed by a main server when the main server has been notified of a boarding rate.

FIG. 6 is a flowchart of an operation performed by the main server 1 when the main server 1 has been notified of a boarding rate from the on-board device 3, and depicts an operation example at the time of performing Step S2 described above.

The main server 1 is monitoring transmission of the train information including the boarding rate from the on-board device 3 of the train during travel (Step S21). Upon reception of the train information (YES at Step S21), the main server 1 verifies whether a station at which the train, which is a sender of the train information, stops next is on a special day (Step S22). The "special day" is a day, for example, when there is an event around the station, and when it is estimated that the number of users of the station is larger than normal. As a result of the verification, when it is the "special day" (YES at Step S22), the main server 1 determines that prediction accuracy of the number of alighting passengers at the station largely degrades, and thus does not transmit the congestion rate immediately before boarding to the station server 2 (does not calculate the congestion rate immediately before boarding). That is, the main server 1 does not display the guidance of the congestion rate immediately before boarding at the next stop (Step S25).

On the other hand, when it is not the "special day" (NO at Step S22), the main server 1 calculates the congestion rate immediately before boarding at the next stop of the train based on the train information received from the on-board device 3, the information registered in the database 4, and the platform information of the next stop of the train (a train in which the on-board device 3, which is the sender of the train information, is installed) controlled by the traffic control system 5 (Step S23).

A calculation method of the congestion rate immediately before boarding is explained here. It is assumed that the main server 1 creates and holds the sub-database shown in FIG. 4 in advance based on the information registered in the database 4 (see FIG. 2). However, it is not essential to create and hold the sub-database in advance. The main server 1 can calculate the congestion rate immediately before boarding by directly using the information registered in the main database (the database 4).

When calculating the congestion rate immediately before boarding, the main server 1 refers to the sub-database in FIG. 4 to acquire the alighting rate used for a calculation process. The sub-database as shown in FIG. 4 is constructed for each platform of each station on the railway line, and held in a storage unit (not shown) inside or outside of the main server 1. At the time of acquiring the alighting rate, after having specified the sub-database corresponding to an arrival platform at the next stop, the main server 1 refers to the records controlled in the specified sub-database to acquire the alighting rate (an alighting rate of each vehicle) registered in the records that store the matched date (a period), time (a period of time), weekday/holiday (the type of day), train type, and destination. The time (the period of time) is determined based on whether the arrival time of the train at the next stop matches (in which period the arrival time is included). The alighting rate is a mean value of the actual alighting rates (actual values) under the same past conditions (trains having the same period, period of time, type of day, train type, and destination). The main server 1 then uses the acquired alighting rate and the boarding rate included in the train information received from the on-board device 3 to calculate the congestion rate immediately before boarding of each vehicle according to the following equation.

"congestion rate immediately before boarding"="boarding rate"×(100−alighting rate)/100

The main server 1 then transmits the congestion rate immediately before boarding of each vehicle calculated at Step S23 to the station server 2 of the relevant station (the next stop of the train) together with the information of the formation number and an arrival platform of the train (Step S24). For example, the information transmitted from the main server 1 to the station server 2 is as shown in FIG. 7.

In the above example, when the next stop of the train is on the special day, calculations and transmissions of the congestion rate immediately before boarding are not performed. However, the congestion rate immediately before boarding can be calculated and transmitted by using a special calculation method for the special day. Alternatively, the congestion rate immediately before boarding is not transmitted but the congestion rate of the vehicle during travel (a boarding rate included in the train information received from the on-board device 3) can be directly transmitted. At this time, it is desired to transmit information indicating that it is the normal congestion rate (a congestion rate of the vehicle during travel), which is not the congestion rate immediately before boarding, together with the congestion rate.

In this manner, the main server 1 calculates the congestion rate immediately before boarding of each vehicle of the train during travel (a congestion rate at a time when alighting is complete after the train has arrived at the next stop), and transmits the calculated information to the station server 2 that performs guidance display by using the information.

<Operation of Station Server 2 at the Time of Receiving Congestion Rate Immediately Before Boarding from Main Server 1: Operation at the Time of Performing Step S3 Described Above>

FIG. 8 is a flowchart of an operation performed by the station server 2 when the station server 2 has received a congestion rate immediately before boarding from the main server 1, and depicts an operation example at the time of performing Step S3 described above.

The station server 2 is monitoring transmission of the congestion rate immediately before boarding from the main server 1 (Step S31), and continues normal display (advertisement contents display, destination display, and the like) on the display device 6 (Step S34) until the congestion rate immediately before boarding is received (NO at Step S31). On the other hand, upon reception of the congestion rate immediately before boarding (YES at Step S31), the station server 2 generates contents for notifying the congestion rate immediately before boarding (Step S32). The station server 2 causes the display device 6 installed on the relevant platform (the arrival platform of the train) to display the contents for notifying the congestion rate immediately before boarding (Step S33). As the timing of displaying the contents for notifying the congestion rate immediately before boarding, for example, (1) a timing according to a display sequence determined in advance, (2) to perform interruption display at a time when creation of the contents is complete and continue display for a predetermined time, (3) to start display at a specific timing after creation of the contents is complete, and continue display until the train arrives, and the like can be considered. Specifically, with regard to (1), the timing for performing display is scheduled in advance, and the display is switched according to the display schedule together with other types of display (advertisement contents, destination contents, and the like). When generation of the contents for notifying the congestion rate immediately before boarding is not complete at a time when it becomes the display timing of the contents for notifying the congestion rate immediately before boarding, the display is skipped. Needless to mention, other methods can be used.

<Operation of on-Board Device 3 During Stop at Station: Operation at the Time of Performing Step S4 Described Above>

Figure 9:
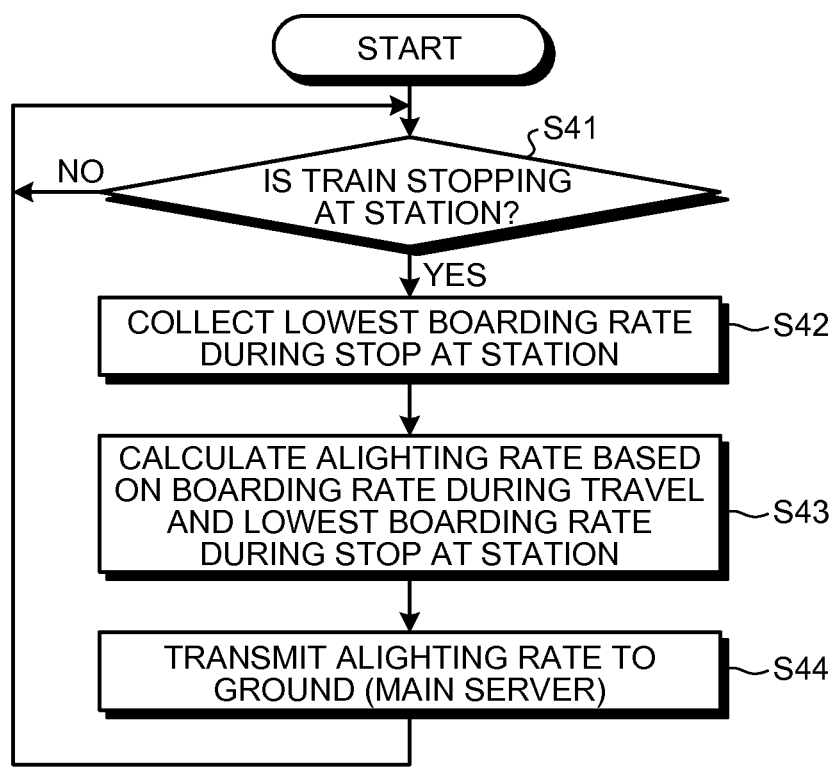
FIG. 9 is a flowchart of an operation performed by the on-board device while a train is stopping at a station.

FIG. 9 is a flowchart of an operation performed by the on-board device 3 while a train is stopping at a station, and depicts an operation example at the time of performing Step S4 described above.

After having performed a process shown in FIG. 5 (a process of transmitting the train information including the boarding rate to the main server 1), the on-board device 3 monitors whether the train has arrived at the next stop (whether the train is in a stopping state at the station) (Step S41). As a result of monitoring, when having detected that the train is stopping at the station (YES at Step S41), the on-board device 3 collects the lowest boarding rate (the congestion rate) during stop at the station (Step S42). At Step S42, for example, the on-board device 3 monitors the vehicle weight, thereby monitoring fluctuations in the boarding rate of each vehicle. The on-board device 3 detects the lowest value of the boarding rate detected until departure of the train from the station as the "lowest boarding rate during stop at the station". The on-board device 3 then calculates the alighting rate at this station based on the detection result (the lowest boarding rate during stop at the station) and the boarding rate held at the time of performing the process shown in FIG. 5 (corresponding to the boarding rate during travel before the train arrives at the station) (Step S43).

The lowest boarding rate during stop is the lowest congestion rate during stop explained above, and is the same information as the congestion rate immediately before boarding described above.

The alighting rate is calculated for each vehicle according to the following equation.

"alighting rate"={("boarding rate during travel"–
"lowest boarding rate during stop at station")/
"boarding rate during travel"}×100

As explained above, the alighting rate is information indicating how much the boarding rate (the congestion rate) at the time of arriving at the station has changed at a time when alighting of users is complete at the station, and indicates that the congestion rate largely decreases due to alighting of users at the station, with an increase of the alighting rate. The alighting rate is information collected to be used in the future calculation process of the congestion rate immediately before boarding (a process shown in FIG. 6).

After having calculated the alighting rate, the on-board device 3 transmits the alighting rate to the main server 1 (Step S44). The on-board device 3 can transmit the alighting rate to the main server 1, together with the boarding rate calculated by performing the process shown in FIG. 5 after departure from the station (or acquired from the train-information control system). At the time of transmission of the alighting rate, the on-board device 3 adds the identification information (formation information) of the train and the like.

The lowest boarding rate during stop at the station can be acquired not based on the vehicle weight but by other methods (for example, counting the number of alighting passengers by camera images). The calculation of the alighting rate performed at Step S43 described above can be performed by the main server 1. In this case, the on-board device 3 transmits the "lowest boarding rate during stop" acquired by performing Step S42 directly to the main server 1.

<Operation of Main Server 1 when Alighting Rate is Received from on-Board Device 3: Operation at the Time of Performing Step S5 Described Above>

Figure 10:
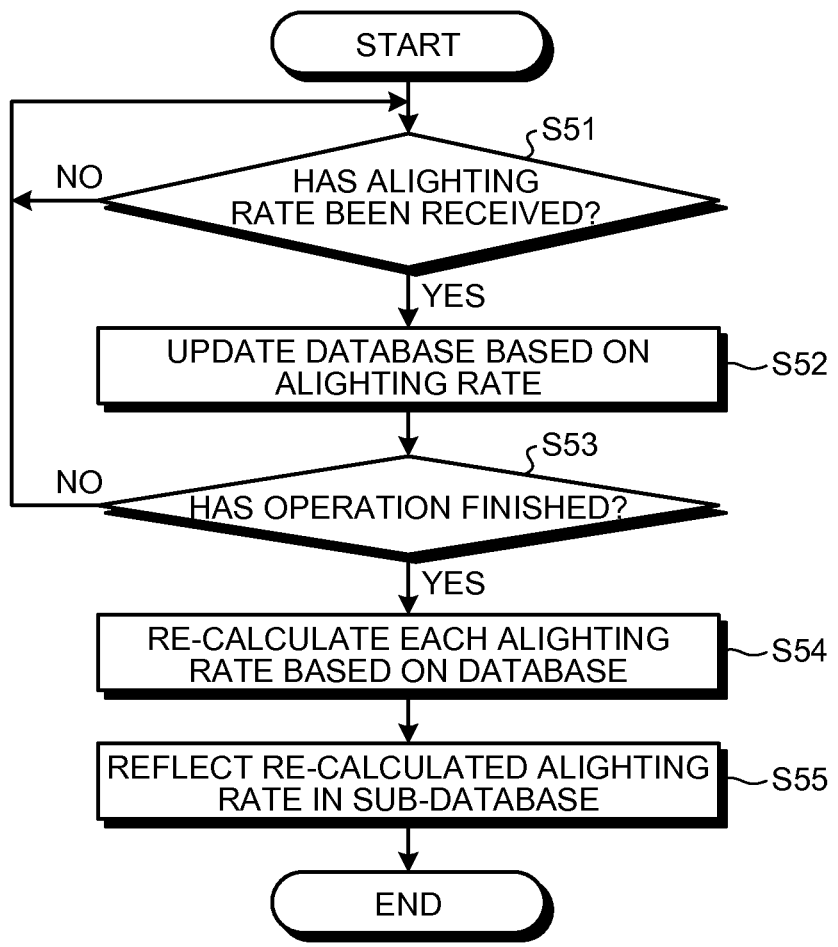
FIG. 10 is a flowchart of an operation performed by the main server when the main server has been notified of an alighting rate.

FIG. 10 is a flowchart of an operation performed by the main server 1 when the main server 1 has been notified of an alighting rate from the on-board device 3, and depicts an operation example at the time of performing Step S5 described above.

The main server 1 is monitoring transmission of the alighting rate from the on-board device 3 (Step S51), and upon reception of the alighting rate (YES at Step S51), the main server 1 updates the database 4 based on the received alighting rate (Step S52). Specifically, the main server 1 accumulates the received alighting rate in association with the time, train type, destination, station, arrival platform, and the like in the database 4.

Furthermore, at the time of finishing the operation (YES at Step S53), the main server 1 re-calculates the alighting rate to be held in the sub-database based on the information registered in the database 4 and updates the sub-database (Steps S54 and S55). In the re-calculation of the alighting rate, the main server 1 extracts records having common "station", "platform", "date", "time", "weekday/holiday", "train type", and "destination" from the main server 1 to calculate a mean value of the alighting rates included in the extracted respective records.

As described above, in the in-vehicle congestion-status display system according to the present embodiment, at each station on the railway line, changes in the boarding rate (a congestion rate) during travel of the arrived train and changes in the boarding rate at a time when alighting at the station is complete are monitored, and the alighting rate indicating how much the boarding rate at the time of completion of alighting of users changes (decreases) is collected and compiled in a database. The congestion rate immediately before boarding of the arriving train (a congestion rate at the time of completion of alighting) is calculated based on the boarding rate during travel of the train and the alighting rate registered in the database, and the calculated congestion rate immediately before boarding is notified to users by using the display device on the platform of the station. Accordingly, the congestion rate also taking the number of alighting passengers at the station into consideration can be notified to the users on the platform, thereby enabling to provide the information of the in-vehicle congestion status before boarding to the users, with a reliability higher than conventional technology. Because users are guided to a vehicle having a low congestion rate, the time required for boarding (a required time until boarding of all the users is complete) can be shortened, and occurrence of a delay of the train associated with congestion can be avoided.

The congestion rate immediately before boarding calculated by the main server 1 during travel of the train and the alighting rate calculated by the on-board device 3 during stop at the station are similar pieces of information, and it has been explained above that it is desired that the congestion rate immediately before boarding, which is a predicted value, approaches the alighting rate, which is an actual measurement value. Therefore, to improve the prediction accuracy, a difference between the congestion rate immediately before boarding and the alighting rate is calculated after acquiring the alighting rate and compiled in a database, and the congestion rate immediately before boarding can be corrected by using the database of the difference. For example, the difference is held in the database 4 in association with the alighting rate, and a mean value of the differences is also calculated at the time of calculating the alighting rate (the mean value) to be registered in the sub-database and registered in the sub-database. At the time of calculating the congestion rate immediately before boarding, the congestion rate immediately before boarding is corrected by using the difference (a predicted value of an error from the alighting rate).

Second Embodiment

In the first embodiment, the in-vehicle congestion-status display system that notifies users on a platform of a station of an in-vehicle congestion status has been explained. On the other hand, a second embodiment explains an in-vehicle congestion-status display system that notifies users in a vehicle of a congestion status of a train to make a connection (a connecting train) in advance, for example, when trains of different lines arrive at the same time and connections are made.

Figure 11:
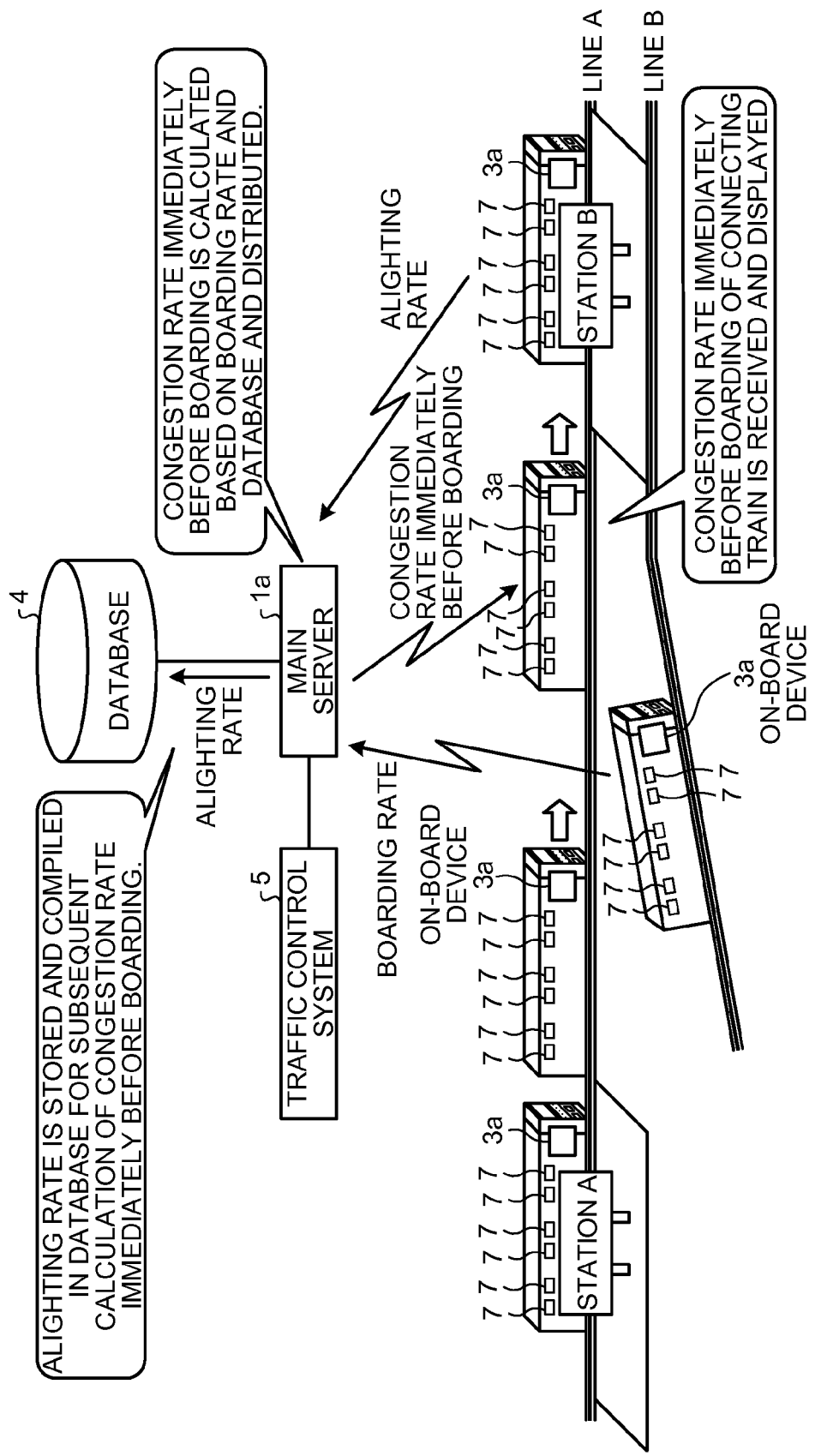
FIG. 11 is an overall configuration example and an operation outline of an in-vehicle congestion-status display system according to a second embodiment.

FIG. 11 is an overall configuration example and an operation outline of an in-vehicle congestion-status display system according to the second embodiment. As shown in FIG. 11, the in-vehicle congestion-status display system according to the second embodiment includes a main server 1a, an on-board device 3a mounted on a train, the database 4, the traffic control system 5, and a display device 7 installed in a vehicle. The train shown in FIG. 11 is a single-vehicle train as in FIG. 1 used for explanations of the first embodiment. However, in practice, a train (a formation) in which a plurality of vehicles are coupled together is assumed. For convenience, the operation outline when the congestion rate immediately before boarding during travel on a line B is displayed on the display device 7 in a train during travel on a line A is shown. However, in practice, the congestion rate immediately before boarding of the train during travel on the line A is also displayed on the display device 7 in the train during travel on the line B. The station server 2 and the display device 6 explained in the first embodiment can be installed in each station to notify users on a platform of the congestion rate immediately before boarding of each vehicle of each arriving train.

In the present embodiment, constituent elements common to those of the in-vehicle congestion-status display system according to the first embodiment (see FIG. 1) are denoted by same reference signs. Therefore, explanations of the constituent elements denoted by same reference signs in FIG. 1 are omitted.

The main server 1a has the same function as that of the main server 1 explained in the first embodiment, and calculates the congestion rate immediately before boarding by the same procedure as in the main server 1. However, the second embodiment is different from the first embodiment in that the main server 1a transmits the calculated congestion rate immediately before boarding to a train during travel (a train that connects with another train at the next stop). When the station server is installed in the station, the main server 1a also transmits the congestion rate immediately before boarding to the station server.

The on-board device 3a has a function of generating guidance contents of the congestion rate immediately before boarding acquired from the main server 1a to cause the display device 7 in each vehicle to display the contents, in addition to the function of the station server 2 according to the first embodiment.

<Overall Operation of in-Vehicle Congestion-Status Display System>

Figure 12:
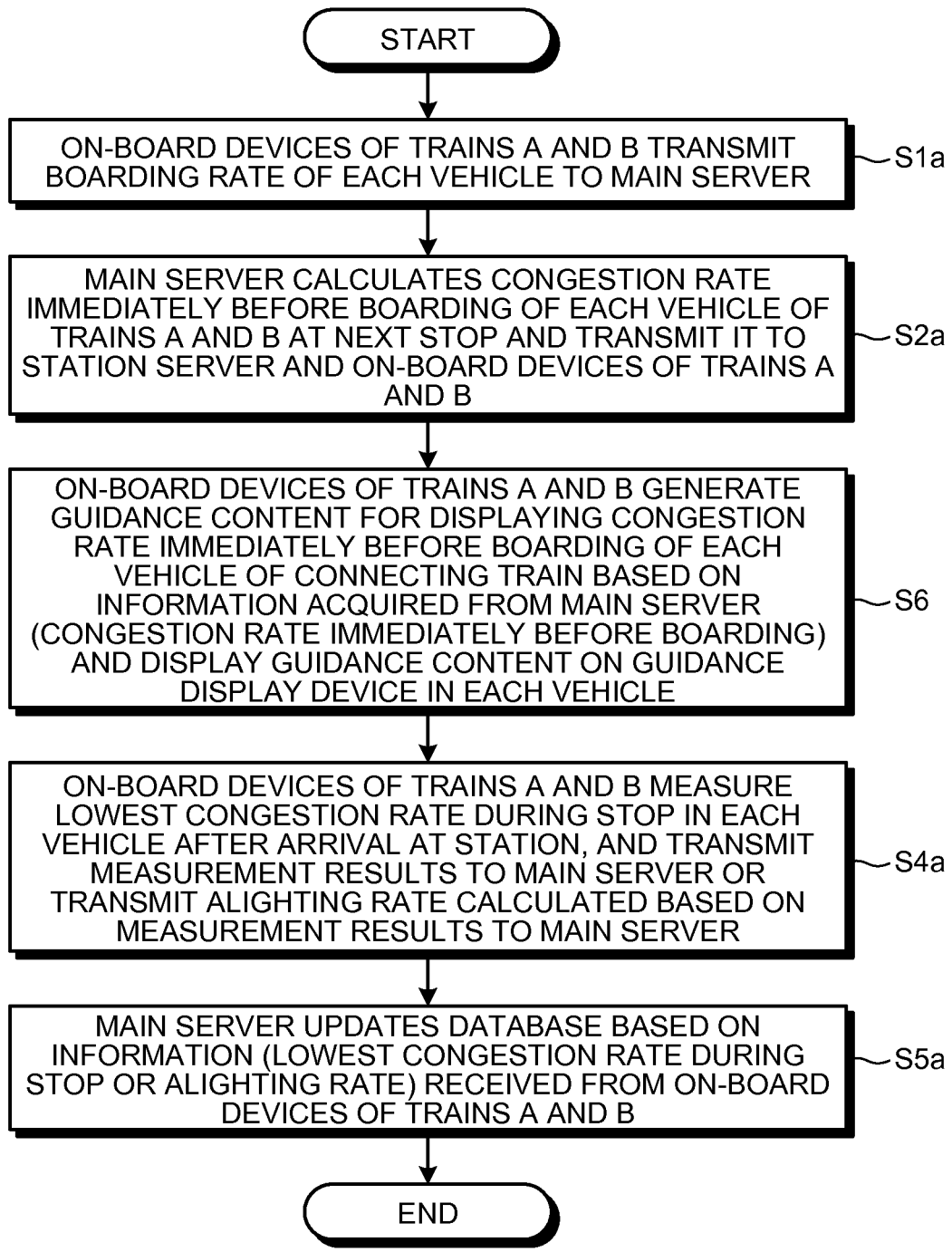
FIG. 12 is a flowchart of an operation outline of the in-vehicle congestion-status display system according to the second embodiment.

An overall operation of the in-vehicle congestion-status display system according to the second embodiment is explained with reference to FIGS. 11 and 12. FIG. 12 is a flowchart of an operation outline of the in-vehicle congestion-status display system according to the second embodiment. An operation example when each train shown in FIG. 11 (a train during travel on the line A and a train during travel on the line B) is traveling toward the station B is explained here. In the following explanations, the train during travel on the line A is referred to as "train A", and that during travel on the line B is referred to as "train B".

After departing from a station, when a certain time has passed, the on-board devices 3a on the trains A and B transmit a boarding rate of each vehicle to the main server 1a (Step S1a). The process is the same as that at Step S1 explained in the first embodiment.

Next, when the main server 1a is notified of the boarding rate from the on-board devices 3a on the trains A and B, the main server 1a calculates the congestion rate immediately before boarding of each vehicle at the next stop of the respective trains based on the notified boarding rate, and transmits the congestion rate immediately before boarding to the on-board devices 3a on the respective trains (Step S2a). The congestion rate immediately before boarding of the train A is transmitted to the on-board device 3a on the train B, and the congestion rate immediately before boarding of the train B is transmitted to the on-board device 3a on the train A.

The on-board devices 3a on the trains A and B then create guidance contents of the congestion rate immediately before boarding of each vehicle of a connecting train based on the congestion rate immediately before boarding acquired from the main server 1a to cause the display device 7 in the vehicles to display the contents (Step S6). The connecting train with respect to the train A is the train B, and the connecting train with respect to the train B is the train A.

Next, when the trains A and B arrive at the station (the station B), the respective on-board devices 3a on the trains A and B monitor fluctuations in the congestion rate (the boarding rate) of each vehicle during stop at the station to measure the lowest congestion rate (the lowest congestion rate during stop) of each vehicle, and transmits measurement results (the lowest congestion rate during stop of each vehicle) to the main server 1a. Alternatively, the on-board devices 3a calculate the alighting rate based on the measurement results, and transmit the calculated alighting rate to the main server 1a (Step S4a). The process is the same as that at Step S4 explained in the first embodiment.

The main server 1a then updates the database 4 (the main database) based on the information received from the on-board device 3a on each train (the lowest congestion rate during stop or the alighting rate, and the information transmitted together therewith) (Step S5a). The process is the same as that at Step S5 explained in the first embodiment.

According to such an operation, the users boarding on each train during travel can check the display device 7 installed in the vehicle to know the congestion rate (the congestion rate immediately before boarding) of each vehicle of the connecting train at the next stop in advance, thereby enabling to make connections to a vehicle having a low congestion rate efficiently at a limited connection time. Accordingly, the connection time is shortened, and occurrence of a departure delay of the train can be prevented.

Subsequently, processes at Steps S2a and S6 of respective steps shown in FIG. 12, which are different from the processes explained in the first embodiment, are explained in detail with reference to the drawings.

<Operation of Main Server 1a when Boarding Rate is Notified from on-Board Device 3a of Each Train: Operation at the Time of Performing Step S2a Described Above>

Figure 13:
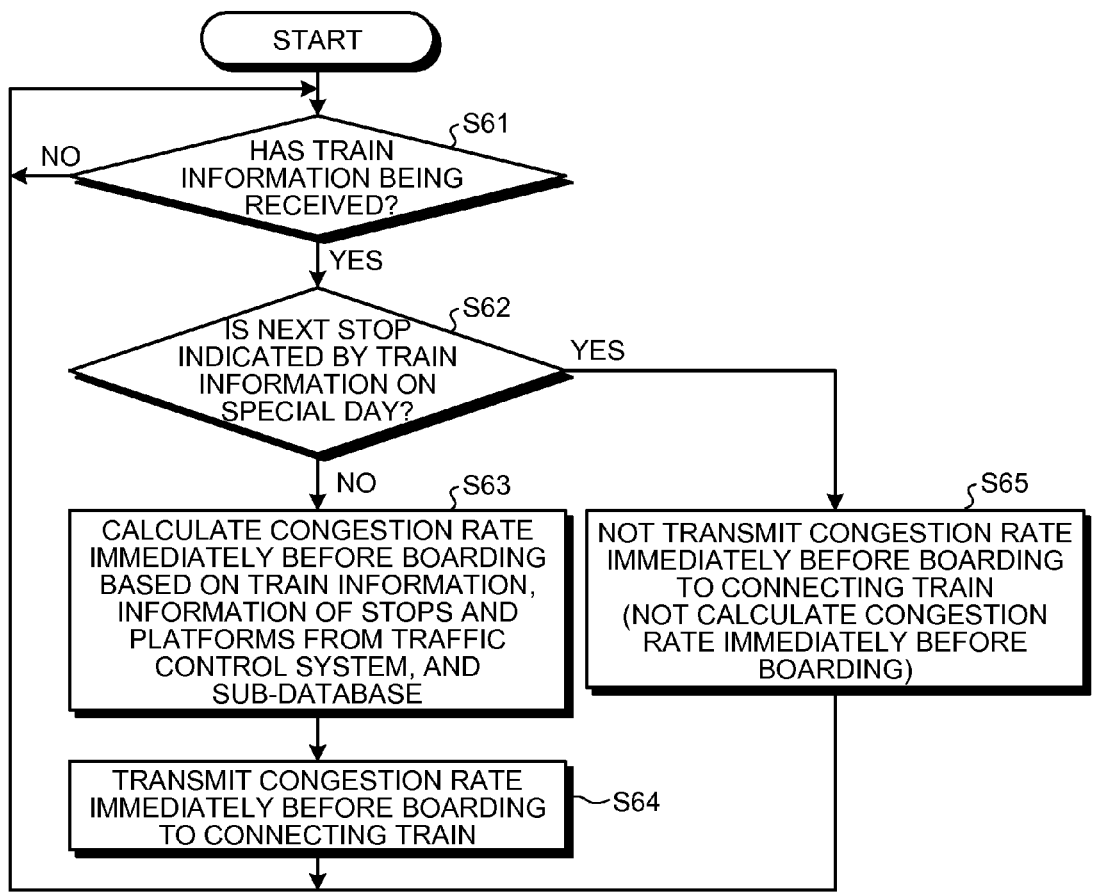
FIG. 13 is a flowchart of an operation performed by a main server when the main server has been notified of a boarding rate.

FIG. 13 is a flowchart of an operation performed by the main server 1a when the main server 1a has been notified of a boarding rate from the on-board devices 3a of each train, and depicts an operation example at the time of performing Step S2a described above.

The main server 1a is monitoring transmission of the train information including the boarding rate from the on-board device 3a of each train during travel (Step S61). Upon reception of the train information (YES at Step S61), the main server 1a verifies whether the station A at which the train, which is a sender of the train information, stops next is on a special day (Step S62). As a result of the verification, when it is the "special day" (YES at Step S62), the main server 1a does not perform a calculation of the congestion rate immediately before boarding and transmission of the congestion rate immediately before boarding to the on-board device 3a.

That is, the guidance display of the congestion rate immediately before boarding of the connecting train is not performed in the train that connects with another train at the next stop (Step S65). At Step S62, the main server 1a can verify whether there is a transfer convenience to a connecting train at the next stop (whether there is another train arriving at the station substantially at the same time for connections) in addition to the verification of whether the next stop is on the special day, and can shift to Step S65 when there is no transfer convenience to the connecting train.

Furthermore, as a result of the verification, when it is not the "special day" (NO at Step S62), the main server 1a calculates the congestion rate immediately before boarding at the next stop of the train based on the train information received from the on-board device 3a, the information registered in the database 4, and the platform information of the next stop of the corresponding train (a train installed with the on-board device 3a, which is the sender of the train information) managed by the traffic control system 5 (Step S63).

Figures 14, 15:
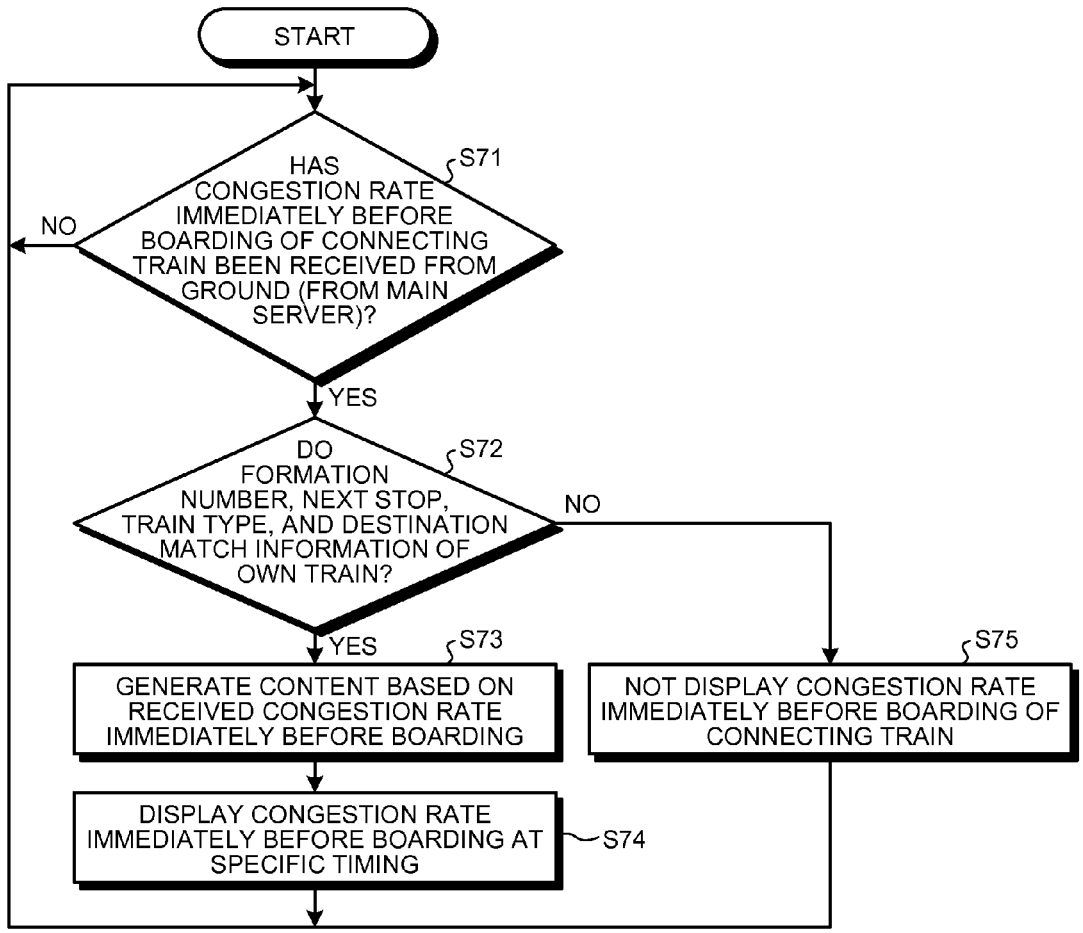
FIG. 14 is an example of information transmitted from the main server to an on-board device.
FIG. 15 is a flowchart of an operation performed by the on-board device when the on-board device has received a congestion rate immediately before boarding.

Lastly, the main server 1a transmits the congestion rates immediately before boarding of each vehicle calculated at Step S63 to the on-board device 3a of the relevant train (the connecting train at the next stop) together with the information of the formation number and the arrival platform of the train (Step S64). The information transmitted from the main server 1a to the on-board device 3a is, for example, as shown in FIG. 14. The main server 1a specifies the train (a connecting train) as a transmission destination of the calculated congestion rate immediately before boarding, for example, by making an inquiry to the traffic control system 5.

In this manner, the main server 1a calculates the congestion rate immediately before boarding of each vehicle of the train during travel (a congestion rate at a time when alighting is complete, after arrival at the next stop), and transmits the calculated information to the on-board device 3a of the connecting train that performs guidance display by using the information.

<Operation of the on-Board Device 3a when the Congestion Rate Immediately Before Boarding is Received from the Main Server 1a: Operation at the Time of Performing Step S6 Described Above>

FIG. 15 is a flowchart of an operation performed by the on-board device 3a when the on-board device 3a has received a congestion rate immediately before boarding from the main server 1a, and depicts an operation example at the time of performing Step S6 described above.

The on-board device 3a on each train is monitoring transmission of the congestion rate immediately before boarding of the connecting train at the next stop from the main server 1a (Step S71). Upon reception of the congestion rate immediately before boarding (YES at Step S71), the on-board device 3a verifies the additional information transmitted together with the congestion rate immediately before boarding to determine whether the formation number, the next stop, the train type, and the destination match the information of its own train, that is, whether correct information (a congestion rate immediately before boarding) transmitted to its own train is received (Step S72). As a result of the verification, when the received information is not the correct information (NO at Step S72), the on-board device 3a does not perform any notification of the congestion rate immediately before boarding (Step S75). On the other hand, when the received information is the correct information (YES at Step S72), the on-board device 3a generates guidance contents of the congestion rate immediately before boarding of the connecting train (Step S73). The on-board device 3a causes the display device 7 installed in the vehicle to display the guidance contents of the congestion rate immediately before boarding (Step S74). Notification corresponding to a position of the vehicle can be performed. For example, when the formation (the number of coupled vehicles) of both trains making connections is the same, in the Nth vehicle from the first vehicle, notification of the congestion rate immediately before boarding is performed with respect to two vehicles each before and after the Nth vehicle (five vehicles in total) from the first vehicle of the connecting train. At this time, in the first vehicle or the last vehicle, adjustment is appropriately made in such a manner that notification of the congestion rate immediately before boarding is performed up to the third vehicle from the first vehicle or the last vehicle.

As described above, in the in-vehicle congestion-status display system according to the present embodiment, changes in the boarding rate (the congestion rate) during travel of the arrived train and changes in the boarding rate when alighting is complete at the station are monitored at each station in the respective lines, and the alighting rate indicating how much the boarding rate changes (decreases) at a time when alighting of users is complete are collected and compiled in a database. Furthermore, the congestion rate immediately before boarding of the arriving train (the congestion rate when alighting is complete) is calculated based on the boarding rate of the train during travel and the alighting rate registered in the database, and the calculated congestion rate immediately before boarding is notified to the users (passengers of the train) by using the display device in each vehicle of each train making connections with each other at the next stop. Accordingly, the congestion rate taking the number of alighting passengers at the station into consideration can be notified to the users boarding in the train, thereby enabling smooth connections at the stop and equalization of the congestion rate after connections.

INDUSTRIAL APPLICABILITY

As described above, the in-vehicle congestion-status display system according to the present invention is useful for railway systems, and is particularly useful as a guidance system that notifies a congestion rate in a vehicle before boarding to users.

REFERENCE SIGNS LIST 1, 1a main server
2 station server
3, 3a on-board device
4 database
5 traffic control system
6, 7 display device

The invention claimed is:
1. A vehicle congestion-status display system that notifies railway users of a congestion status of each vehicle of a train, the system comprising:
    a main server that calculates a congestion rate immediately before boarding, which is a predicted value of a congestion rate when alighting of users is complete at a station, for each vehicle of the train, based on a congestion rate during travel and an alighting rate acquired in a past and held as information indicating a difference between a congestion rate during travel immediately before arriving at the station and a congestion rate when alighting of users is complete after arriving at a next stop of the train; and a display device that notifies users of the congestion rate immediately before boarding calculated for each vehicle of the train, wherein when the train arrives at a station where it is known in advance that an error from an actual congestion rate is expected to increase, when the congestion rate immediately before boarding is calculated by using the alighting rate, the main server does not calculate the congestion rate immediately before boarding.

2. The vehicle congestion-status display system according to claim 1, wherein at a time of calculating the congestion rate immediately before boarding, the main server uses an alighting rate acquired and held at a same period of time as the time when the calculation is performed.

3. The vehicle congestion-status display system according to claim 1, wherein at a time of calculating the congestion rate immediately before boarding, in a case of a calculation on a weekday, the main server uses an alighting rate with a type of the train being matched, which has been acquired and held at a same period of time as the time when the calculation is performed on a weekday, whereas in a case of a calculation on a holiday, the main server uses an alighting rate with a type of the train being matched, which has been acquired and held at a same period of time as the time when the calculation is performed on a holiday.

4. The vehicle congestion-status display system according to claim 1, wherein at a time of calculating the congestion rate immediately before boarding, when there are a plurality of alighting rates acquired and held at a same period of time as the time when the calculation is performed, the main server uses a mean value of the alighting rates.

5. The vehicle congestion-status display system according to claim 1, further comprising an on-board device that is installed in the train, calculates the congestion rate during travel at a predetermined timing after departing from a station, for each vehicle of the train, and during stop at a station, calculates a lowest congestion rate during stop indicating a lowest value of the congestion rate, and calculates an alighting rate based on the lowest congestion rate during stop and the congestion rate during travel calculated during travel before arriving at the station where the train is currently stopping.

6. The vehicle congestion-status display system according to claim 1, further comprising an on-board device that is installed in the train, calculates the congestion rate during travel at a predetermined timing after departing from a station, for each vehicle of the train, and during stop at a station, calculates the lowest congestion rate during stop indicating a lowest value of the congestion rate, wherein when the lowest congestion rate during stop is calculated by the on-board device, the main server calculates the alighting rate based on the calculated lowest congestion rate during stop and the congestion rate during travel calculated during travel before arriving at the station where the lowest congestion rate during stop has been calculated.

7. The vehicle congestion-status display system according to claim 1, wherein the display device is installed as a display device on a platform of a station, and the display device displays contents indicating a congestion rate immediately before boarding of each vehicle of a next arriving train.

8. The vehicle congestion-status display system according to claim 1, wherein the display device is installed as a display device in each vehicle of the train, and the display device displays contents indicating a congestion rate immediately before boarding of each vehicle of a connecting train at a next stop of its own train.

9. The vehicle congestion-status display system according to claim 1, wherein the display device includes a first display device installed on a platform of a station and a second display device installed in each vehicle of the train, the first display device displays contents indicating a congestion rate immediately before boarding of each vehicle of a next arriving train, and the second display device displays contents indicating a congestion rate immediately before boarding of each vehicle of a connecting train at a next stop of its own train.

10. A congestion-status guidance method of notifying railway users of a congestion status of each vehicle of a train, the method comprising:

calculating, by a main server installed on a ground, a congestion rate immediately before boarding, which is a predicted value of a congestion rate when alighting of users is complete at a station, for each vehicle of the train, based on a congestion rate during travel and an alighting rate acquired in a past and held as information indicating a difference between a congestion rate during travel immediately before arriving at the station and a congestion rate when alighting of users is complete after arriving at a next stop of the train; and notifying, by a display device installed on a platform of a station or in the train, users of the congestion rate immediately before boarding calculated for each vehicle of the train by display, wherein when the train arrives at a station where it is known in advance that an error from an actual congestion rate is expected to increase, when the congestion rate immediately before boarding is calculated by using the alighting rate, the congestion rate immediately-before-boarding calculating step is not performed.

11. The congestion-status guidance method according to claim 10, wherein in the calculating, an alighting rate acquired and held at a same period of time as the time when the calculation of the congestion rate immediately before boarding is performed is used.

12. The congestion-status guidance method according to claim 10, wherein in the calculating, when there are a plurality of alighting rates acquired and held at a same period of time as the time when the calculation of the congestion rate immediately before boarding is performed, a mean value of the alighting rates is used.

* * * * *